United States Patent
Duquesne et al.

(10) Patent No.: US 10,827,683 B2
(45) Date of Patent: Nov. 10, 2020

(54) SIEVE ASSEMBLY FOR A CROP PROCESSING SYSTEM OF AN AGRICULTURAL HARVESTER

(71) Applicant: CNH Industrial America LLC, New Holland, PA (US)

(72) Inventors: Frank Rik Duquesne, Zwevegem (BE); Curtis F. Hillen, Lititz, PA (US); Todd Cannegieter, Boiling Springs, PA (US); Kevin N. Scotese, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 201 days.

(21) Appl. No.: 15/969,230

(22) Filed: May 2, 2018

(65) Prior Publication Data

US 2019/0335667 A1    Nov. 7, 2019

(51) Int. Cl.
*A01F 12/44*    (2006.01)
*A01F 12/46*    (2006.01)

(52) U.S. Cl.
CPC ............ *A01F 12/446* (2013.01); *A01F 12/46* (2013.01)

(58) Field of Classification Search
CPC ...... A01F 12/44; A01F 12/446; A01F 12/448; A01F 12/46; A01F 12/00; A01F 12/30; A01F 12/32; A01F 12/18; A01F 12/26; A01D 75/282; A01D 41/12
See application file for complete search history.

(56) References Cited

U.S. PATENT DOCUMENTS

| | | |
|---|---|---|
| 3,757,797 A * | 9/1973 | Mathews ................ A01F 7/06 460/91 |
| 4,480,643 A | 11/1984 | Alm |
| 4,531,528 A | 7/1985 | Peters et al. |
| 4,561,972 A | 12/1985 | Alm |
| 7,297,051 B1 | 11/2007 | Schmidt et al. |

(Continued)

FOREIGN PATENT DOCUMENTS

| | | |
|---|---|---|
| CN | 105875077 A | 8/2016 |
| EP | 3075227 A1 | 10/2016 |

OTHER PUBLICATIONS

Extended European Search Report for EP Application No. 19171694.3 dated Oct. 30, 2019 (13 pages).

*Primary Examiner* — Arpad Fabian-Kovacs
(74) *Attorney, Agent, or Firm* — Peter Zacharias; Patrick Sheldrake

(57) ABSTRACT

A sieve assembly for use within an agricultural harvester may generally include a sieve, a crop material sheet, and at least one support element. The sieve extends along a length defined between a first sieve end and a second sieve end and processes a flow of harvested crop material. The sieve also defines a plurality of openings through which cleaned crop material of the flow of crop material is directed. The crop material sheet extends along a length defined between a first sheet end and a second sheet end and receives the cleaned crop material directed through the sieve's openings. The crop material sheet then directs the flow of cleaned crop material towards a separate component of the crop processing system. In addition, the support element(s) is directly coupled between the sieve and the crop material sheet and structurally connects the sieve to the crop material sheet.

20 Claims, 5 Drawing Sheets

(56) References Cited

U.S. PATENT DOCUMENTS

| | | | |
|---|---|---|---|
| 7,413,507 B2 | 8/2008 | Weichholdt | |
| 9,226,450 B2 | 1/2016 | Pearson et al. | |
| 2010/0018177 A1* | 1/2010 | Ricketts | A01F 11/06 |
| | | | 56/103 |
| 2014/0128133 A1* | 5/2014 | Claerhout | A01F 12/446 |
| | | | 460/101 |
| 2015/0087364 A1 | 3/2015 | Adamson et al. | |
| 2015/0087366 A1* | 3/2015 | Pearson | A01F 12/34 |
| | | | 460/95 |
| 2016/0029562 A1* | 2/2016 | De Smet | A01F 12/32 |
| | | | 460/1 |
| 2016/0286728 A1* | 10/2016 | De Smet | A01F 12/448 |
| 2019/0183053 A1* | 6/2019 | Narayanan | A01F 12/32 |

* cited by examiner

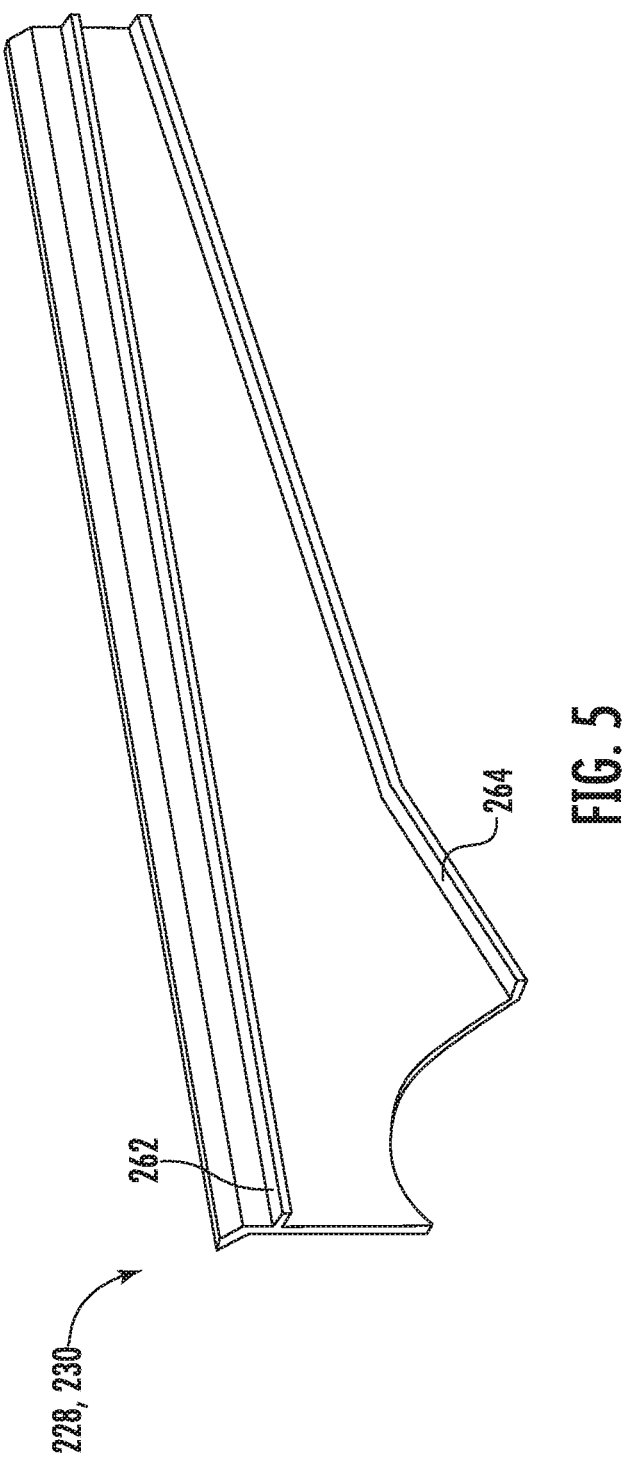

SIEVE ASSEMBLY FOR A CROP PROCESSING SYSTEM OF AN AGRICULTURAL HARVESTER

FIELD OF THE INVENTION

The present subject matter relates generally to agricultural harvesters and, more particularly, to a sieve assembly configured for use within a crop processing system of an agricultural harvester.

BACKGROUND OF THE INVENTION

A harvester is an agricultural machine used to harvest and process crops. For instance, a combine harvester may be used to harvest grain crops, such as wheat, oats, rye, barley, corn, soybeans, and flax or linseed. In general, the objective is to complete several processes within one pass of the machine over a field. In this regard, most harvesters are equipped with a detachable harvesting implement, such as a header, which cuts and collects the crop from the field. The harvester also includes a crop processing system, which performs various processing operations (e.g., threshing, separating, cleaning, etc.) of the harvested crop received from the harvesting implement. Furthermore, the harvester includes a crop tank, which receives and stores the crop after processing.

The crop processing system typically includes sieves or shoes that are reciprocally moved, usually in the fore and aft directions, to separate or sift the grain from tailings and material other than grain (MOG). With many harvesters, as the grain is cleaned from the MOG, it falls through the sieves and drops onto or into one or more separate clean grain pans that are disposed below the sieves.

It is known to separately mount the sieves and the clean grain pans within the crop processing system of the harvester. Typically, separately mounting the sieves and the clean grain pans within the crop processing system requires that each of such components includes one or more separate support structures to provide structural rigidity to the component. With chassis configurations limiting the space available for the various components of the crop processing system, it is important that these components be as space-efficient as possible to increase the crop processing capacity of the harvester.

Accordingly, an improved sieve assembly for a crop processing system that allows for more efficient and/or effective use of the space within an agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In one embodiment, the present subject matter is directed to a sieve assembly for use in a crop processing system of an agricultural harvester. The sieve assembly may generally include a sieve, a crop material sheet, and at least one support element. The sieve extends along a length defined between a first sieve end and a second sieve end and processes a flow of harvested crop material. The sieve also defines a plurality of openings through which cleaned crop material of the flow of crop material is directed. The crop material sheet extends along a length defined between a first sheet end and a second sheet end and receives the cleaned crop material directed through the plurality of openings of the sieve. The crop material sheet then directs the flow of cleaned crop material towards a separate component of the crop processing system. In addition, the support element(s) is directly coupled between the sieve and the crop material sheet and structurally connects the sieve to the crop material sheet.

In another embodiment, the present subject matter is directed to a crop processing system of an agricultural harvester. The crop processing system may generally include a crop delivery apparatus, a storage tank configured to receive a flow of cleaned crop material from the crop delivery apparatus, and a sieve assembly. The sieve assembly is positioned upstream of the crop delivery apparatus relative to the flow of cleaned crop material. The sieve assembly may generally include a sieve, a crop material sheet, and at least one support element. The sieve extends between a first sieve end and a second sieve end and processes a flow of crop material. The sieve defines a plurality of openings through which the flow of cleaned crop material is then directed. The crop material sheet extends between a first sheet end and a second sheet end and receives the flow of cleaned crop material directed through the plurality of openings of the sieve. The crop material sheet then directs the flow of cleaned crop material towards the crop delivery apparatus. The support element(s) is directly coupled between the sieve and the clean crop material sheet and structurally connect the sieve to the crop material sheet. The crop delivery apparatus transports the flow of cleaned crop material received from the sieve assembly to the storage tank of the agricultural harvester.

In a further embodiment, the present subject matter is directed to a sieve assembly for use in a crop processing system for an agricultural harvester that cleans a crop material moving along a direction of a flow. The sieve assembly includes a sieve and a crop material sheet. The sieve extends between a first sieve end and a second sieve end and processes a received flow of crop material. The sieve defines a plurality of openings through which a flow of cleaned crop material is directed. The crop material sheet extends between a first sheet end and a second sheet end and receives the flow of cleaned crop material directed through the plurality of openings of the sieve. The crop material sheet then directs the flow of cleaned crop material towards a separate component of the crop processing system. The sieve and the crop material sheet are coupled together such that the sieve assembly is installable within and removable from the agricultural harvester as a unitary assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 illustrates a perspective view of one embodiment of one of the support elements of the sieve assembly shown in FIG. 3 in accordance with aspects of the present subject matter.

DETAILED DESCRIPTION OF THE INVENTION

Figure 1:
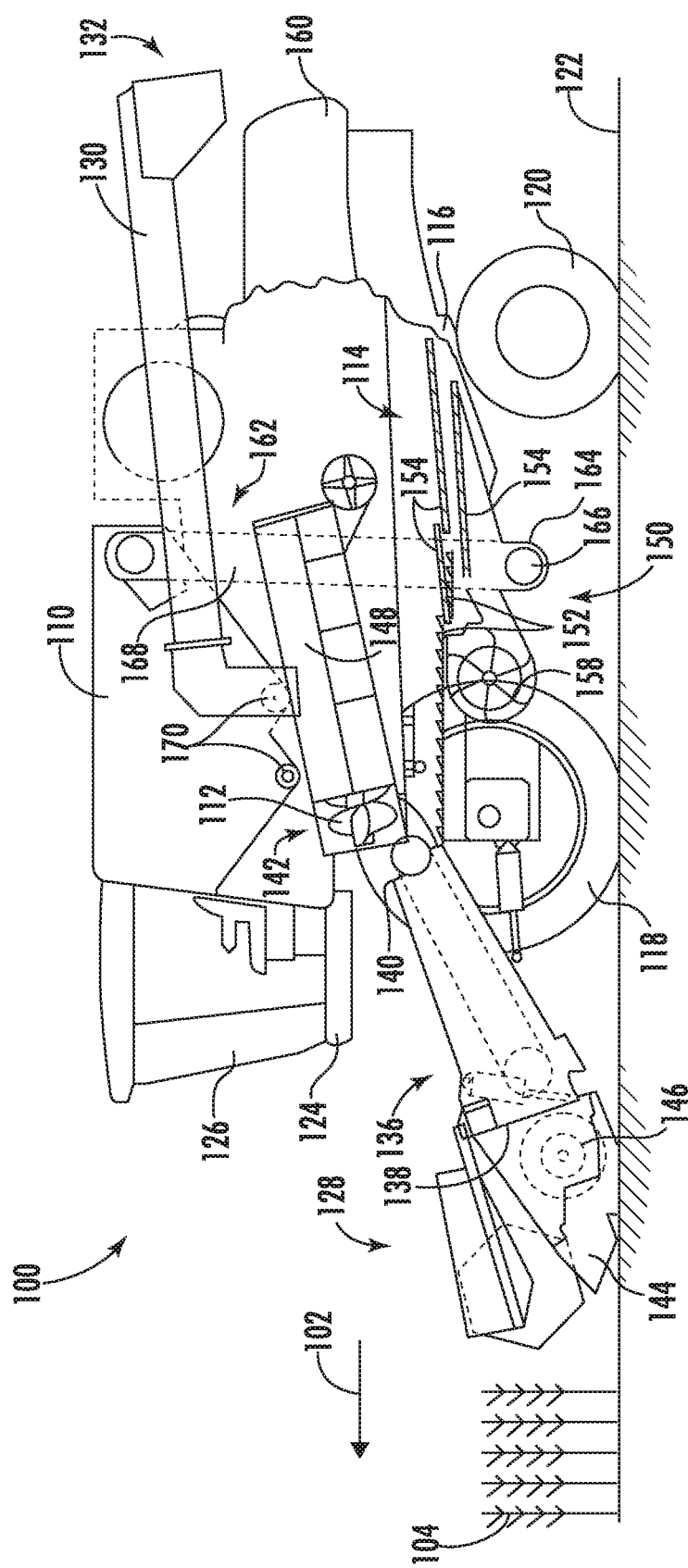
FIG. 1 illustrates a side view of one embodiment of an agricultural harvester in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a sieve assembly configured for use within a crop processing system of an agricultural harvester. Specifically, in several embodiments, the sieve assembly may include a sieve for separating grain from tailings and material other than grain (MOG) within a flow of harvested crop material directed through the harvester and a clean crop material sheet for receiving the cleaned grain from the sieve and for directing the cleaned grain towards a crop delivery apparatus (e.g., a clean grain conveyor) for subsequent delivery to an associated crop storage tank of the harvester. In accordance with aspects of the present subject matter, the sieve and the clean crop material sheet may be coupled together to form a unitary assembly within the harvester. For example, in several embodiments, one or more support elements may be coupled directly between the sieve and the clean crop material sheet, thereby providing a rigid structural connection between the assembly components. Such a configuration may reduce the number of support elements required for supporting the sieve and the clean crop material sheet within the harvester, thereby increasing the available space within the harvester and reducing the overall weight of the crop processing system.

As will be described below, in several embodiments, the support element(s) may include one or more lateral support elements coupled directly between the sieve and the clean crop material sheet, with the lateral support element(s) extending across a lateral width of the sieve assembly to provide lateral structural support to the assembly. The lateral support element(s) may enclose a gap formed between the downstream end of the sieve and the upstream end of the clean crop material sheet such that the flow of cleaned crop material cannot flow past the adjacent end of the assembly, thereby minimizing loss of cleaned crop material. Moreover, in addition to such lateral support element(s) (or as an alternative thereto), the support element(s) may include one or more vertical support elements coupled directly between the sieve and the clean crop material sheet, with the vertical support element(s) extending vertically between the sieve and the clean crop material sheet at one or more locations along the lateral width of the assembly to provide vertical structural support to the sieve assembly. Such vertical support element(s) may prevent flapping or excessive deformation of the sieve when reciprocated. In one embodiment, the vertical support element(s) may also at least partially enclose an interior space of the assembly defined between its opposed lateral sides to facilitate retention of the cleaned crop material within the enclosed lateral space.

It should be appreciated that, by coupling the sieve and the clean crop material sheet together using the disclosed support element(s), the amount of space required for such components within the harvester may generally be reduced, thereby providing more capacity for the crop processing system of the harvester. Moreover, the sieve assembly formed using the support element(s) may allow for both the sieve and the associated clean crop material sheet to be installed within and/or removed from the agricultural harvester as a single, unitary assembly, thereby facilitating increased efficiency during the performance of both installation and/or servicing operations.

In one embodiment, the sieve of the disclosed sieve assembly may extend along a length defined between a first upstream sieve end and a second downstream sieve end and may be configured to process or clean a flow of harvested crop material as it is directed between its upstream and downstream ends. For example, as the flow of crop material moves towards the downstream end of the sieve, e.g., by a reciprocating motion of the sieve or by gravity, the flow of crop material may be cleaned (e.g., by separating grain from MOG) such that a flow of cleaned crop material falls through openings in the sieve. In some embodiments, multiple sieves may be employed.

Additionally, in one embodiment, the clean crop material sheet of the disclosed sieve assembly may be positioned relative to the sieve such that it receives the flow of cleaned crop material falling through the openings in the sieve. As will be described below, the clean crop material sheet may generally extend along a length defined between a first upstream sheet end and a second downstream sheet end, with the clean crop material sheet being configured to direct the flow of cleaned crop material from its upstream end to its downstream end. In one embodiment, the upstream end of the clean crop material sheet may be coupled to the downstream end of the sieve via one or more of the support elements (e.g., a lateral support element). The flow of cleaned crop material may be directed along all or a substantial portion of the length of the cleaned crop material sheet defined between its upstream and downstream ends. Additionally, in some embodiments, the clean crop material sheet may be angled downwardly from its upstream end to its downstream end to encourage movement of the flow of cleaned crop material towards the downstream end.

Moreover, in several embodiments, the clean crop material sheet may define a profile configured to facilitate enhanced flow of the cleaned crop material towards its downstream end. For example, in one embodiment, the clean crop material sheet may include a first angled section extending downwardly relative to a horizontal reference plane from its upstream end at a first angle and a second angled section extending from the first angled section at a second angle relative to the horizontal reference plane, with the second angle being larger than the first angle. In such embodiment, the flow of cleaned crop material may experience an increase in acceleration and a resultant increase in velocity at the second angled section in comparison to the first angled section. Alternatively, the clean crop material sheet may include one or more curved sections extending between its upstream and downstream ends. In additional embodiments, the clean crop material sheet may have additional angled or curved sections along its length, with each successive section of the additional sections extending downwardly from the horizontal reference plane at a greater angle than a previous section. In such embodiment, the flow of cleaned crop material may experience multiple increases in acceleration and resultant velocity from the upstream end of the clean crop material sheet to the downstream end of the sheet. Such increases may help prevent the sieve from becoming blocked and may improve the overall efficiency of the cleaning system.

Referring now to the drawings, FIG. 1 illustrates a partial sectional side view of an agricultural harvester 100, particularly illustrating various components of the harvester 100. In general, the harvester 100 may be configured to move across a field in a direction of travel (e.g., as indicated by arrow 102) to harvest a standing or windowed crop 104. While traversing the field, the harvester 100 may be configured to process the harvested grain or crop material (shown schematically in FIG. 2 as box 106) and store cleaned crop material 108 (FIG. 2) within a grain or crop storage tank 110 of the harvester 100. In one embodiment, the harvester 100 may be configured as an axial-flow type combine, wherein the harvested crop material 106 is threshed and separated while the crop material 106 is advanced by and along a longitudinally arranged rotor 112. However, it should be appreciated that, in alternative embodiments, the harvester 100 may have any suitable harvester configuration. Further, in accordance with aspects of the present subject matter, the harvester 100 may be configured to clean the harvested crop material 106 via one or more components of a crop processing system 114 of the harvester 100.

As shown in FIG. 1, the harvester 100 may include a chassis or main frame 116 configured to support and/or couple to various components of the harvester 100. For example, in several embodiments, the harvester 100 may include a pair of driven, ground-engaging front wheels 18 and a pair of steerable rear wheels 120 that are coupled to the frame 116. As such, the wheels 118, 120 may be configured to support the harvester 100 relative to a ground surface 122 and move the harvester 100 in the forward direction of travel 102 relative to the ground surface 122. Furthermore, the harvester 100 may include an operator's platform 124 having an operator's cab 126, and the crop processing system 114, all of which may be supported by the frame 116. As will be described below, the crop processing system 114 may be configured to perform various processing operations on the harvested crop material 106 as the crop processing system 114 operates to clean the crop material 106 between a harvesting implement (e.g., header 128) of the harvester 100 and the crop storage tank 110. An unloading system 130 may be configured to convey the cleaned crop material 108 from the crop storage tank 110 to an associated discharge location 132 on the harvester 100. Additionally, as is generally understood, the harvester 100 may include an engine and a transmission mounted on the frame 116. The transmission may be operably coupled to the engine and may provide variably adjusted gear ratios for transferring engine power to the wheels 118, 120 via a drive axle assembly (or via axles if multiple drive axles are employed).

As shown in FIG. 1, the header 128 and an associated feeder 136 of the crop processing system 114 may extend forward of the frame 116 and may be pivotally secured thereto for generally vertical movement. In general, the feeder 136 may be configured to serve as support structure for the header 128. For example, the feeder 136 may extend between a front end 138 coupled to the header 128 and a rear end 140 positioned adjacent to a threshing and separating assembly 142 of the crop processing system 114. As is generally understood, the rear end 140 of the feeder 136 may be pivotally coupled to a portion of the harvester 100 to allow the front end 138 of the feeder 136 and, thus the header 128, to be moved upward and downward relative to the ground 122 to set the desired harvesting or cutting height for the header 128.

As the harvester 100 is propelled forwardly over the field with the standing crop 104, the crop material 106 is severed from the standing crop by a sickle bar 144 at the front of the header 128 and delivered by a header auger 146 to the front end 138 of the feeder 136, which supplies the harvested crop material 106 to the threshing and separating assembly 142. As is generally understood, the threshing and separating assembly 142 may include a cylindrical chamber 148 in which the rotor 112 is rotated to thresh and separate the harvested crop material 106 received therein. That is, the harvested crop material 106 is rubbed and beaten between the rotor 112 and the inner surfaces of the chamber 148, whereby the grain, seed, or the like, is loosened and separated from the straw.

The harvested crop material 106 that has been separated by the threshing and separating assembly 142 may fall onto a crop cleaning assembly 150 of the crop processing system 114. In general, the crop cleaning assembly 150 may include a series of pans 152 and associated sieves 154. As is generally understood, the separated crop material 106 may be spread out via oscillation of the pans 152 and/or sieves 154 and may eventually fall through apertures or openings (not shown) defined in the sieves 154. Additionally, a cleaning fan 158 may be positioned adjacent to one or more of the sieves 154 to provide an air flow through the sieves 154 that removes chaff and other impurities, or more generally material other than grain (MOG), from the crop material 106. For instance, the fan 158 may blow the impurities off of the crop material 106 for discharge from the harvester 100 through the outlet of a straw hood 160 positioned at the back end of the harvester 100. The fan 158 may also assist movement of the crop material 106 along the sieves 154. The cleaned crop material 108 passing through the sieves 154 may then be directed towards a crop delivery apparatus 162, such as a combination of an auger 166 positioned within a trough 164 and an elevator assembly 168, which may be configured to transfer the cleaned harvested crop 108 to the crop storage tank 110. The cleaned crop material 108 contained within the crop storage tank 110 may then be delivered to the unloading system 130 via one or more cross-augers 170 positioned at the bottom of the tank 110.

Figure 2:
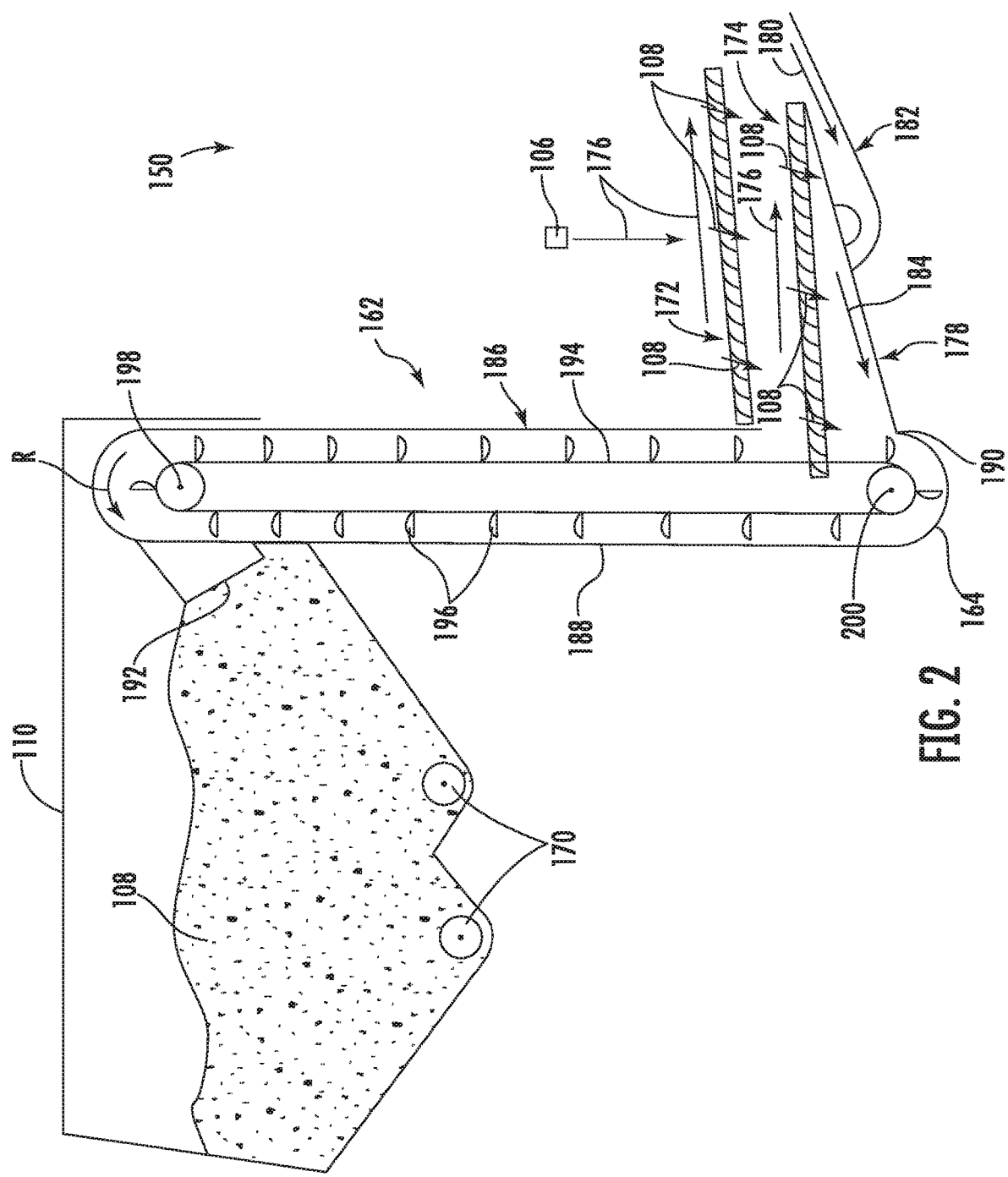
FIG. 2 illustrates a side schematic view of one embodiment of a portion of a crop processing system suitable for use within the agricultural harvester shown in FIG. 1 in accordance with aspects of the present subject matter, particularly illustrating components of a crop cleaning assembly for cleaning the crop material harvested by the harvester and a crop delivery apparatus for delivering the cleaned crop material to an associated storage tank of the harvester.

Referring now to FIG. 2, a side schematic view of one embodiment of a portion of the crop cleaning assembly 150 described above with reference to FIG. 1 is illustrated in accordance with aspects of the present subject matter. In general, the crop cleaning assembly 150 may include one or more components for cleaning the harvested crop material 106 and for delivering such material 106 to an associated crop delivery apparatus 162 for subsequent transport to the storage tank 110 of the harvester 100. For example, as shown in FIG. 2, the crop cleaning assembly 150 may include one or more vibrating or reciprocating sieves, such as an upper sieve 172 and a lower sieve 174, configured to receive harvested crop material 106 from the threshing and separating assembly 142 (FIG. 1). For example, the threshing and separating assembly 142 may separate the harvested grain or crop material 106 from MOG, such as straw, using the rotor 112 rotating within the cylindrical chamber 148. The threshing and separating assembly 142 may then deposit the harvested grain or crop material 106 onto the sieves 172, 174 for further cleaning. For example, the crop material 106 may be initially deposited onto the upper sieve 172 of the crop cleaning assembly 150. The upper sieve 172 may be reciprocated such that the crop material 106 is translated across the upper sieve 172 as a flow 176 of harvested crop material 106, and is thereby cleaned, such that cleaned crop material 108 falls downwardly through openings in the upper sieve 172 towards the lower sieve 174. The lower sieve 174 may, in turn, be reciprocated such that the cleaned crop material 108 is further cleaned as it moves across the lower sieve 174 and that the cleaned crop material 108 falls through openings 156 in the lower sieve 174 towards a clean crop material sheet 178 disposed below the lower sieve 174. Any remaining uncleaned harvested crop material 106 or MOG not directed through the upper sieve 172 and the lower sieve 174 is directed as a flow 180 of MOG and remaining crop material 106 towards and/or along an auxiliary pan 182 to be re-threshed or to be exhausted from the harvester 100. As shown in FIG. 2, the clean crop material sheet 178 is generally angled downwardly towards the crop delivery apparatus 162 such that the cleaned crop material 108 received from the lower sieve 174 is directed downwardly across the clean crop material sheet 178 towards the crop delivery apparatus 162 as a flow 184 of cleaned crop material 108.

In some embodiments, the crop delivery apparatus 162 may generally include the auger 166 (FIG. 1) disposed within trough 164 that transfers the cleaned crop material 108 to a clean crop material conveyor 186, which then transports the cleaned crop material 108 to the storage tank 110. In one embodiment, the clean crop material conveyor 186 may be an elevator assembly 168, such as the centrifugal discharge elevator shown in FIG. 2. In such an embodiment, the elevator assembly 168 may generally include an elevator housing 188 defining an inlet end 190 at or adjacent to the downstream end of the clean crop material sheet 178 and an outlet end 192 at or adjacent to the storage tank 110. The elevator assembly 168 may also include a looped chain 194 and a plurality of crop material paddles or carriers 196 (hereinafter referred to as "carriers" 196) coupled to and evenly spaced apart on the looped chain 194. The chain 194 may generally be configured to move the carriers 196 within the elevator housing 188 along a looped travel path between the inlet and outlet ends 190, 192 of the elevator housing 188 around an upper shaft 198 (and an associated upper sprocket) positioned at an upper end of the looped travel path of the carriers 196 and a lower shaft 200 (and an associated lower sprocket) positioned at a lower end of the looped travel path of the carriers 196. An elevator motor (not shown) may be coupled to one of the shafts 198, 200 (e.g., the upper shaft 198) such that the shaft is rotated about a rotational axis R and the associated sprocket drives the chain 220, thereby allowing the chain 194 and carriers 196 to travel in an endless loop within the elevator housing 188. The carriers 196 may fling or propel the cleaned crop material 108 into the storage tank 110 as the carriers 196 are looped around the upper shaft/sprocket about the rotational axis R. Cross-augers 170 positioned at the bottom of the storage tank 110 help agitate the cleaned crop material 108 for discharge from the harvester 100. It should be appreciated that the crop delivery apparatus 162 and carriers 196 may be configured in any way suitable for lifting the cleaned crop material 108 within the housing 188 of the elevator assembly 168.

In accordance with aspects of the present subject matter, one or more of the sieves of the crop cleaning assembly may be coupled to a corresponding clean crop material sheet to form a unitary, sieve assembly configured for use within the harvester's crop processing system. For example, as will be described below, the lower sieve 174 may be coupled to the adjacent clean crop material sheet 178 via one or more support elements to form a sieve assembly. Such a configuration may allow for the sieve and clean crop material sheet to be installed into and removed from the harvester 100 as an integral assembly, thereby facilitating more efficient installation and/or servicing of such components. In addition, the disclosed sieve assembly 210 may allow for an overall reduction in the space requirements for the crop cleaning assembly 150, as well as reduce the required number of assembly components (thereby reducing the overall weight of the crop cleaning assembly 150).

Figure 3:
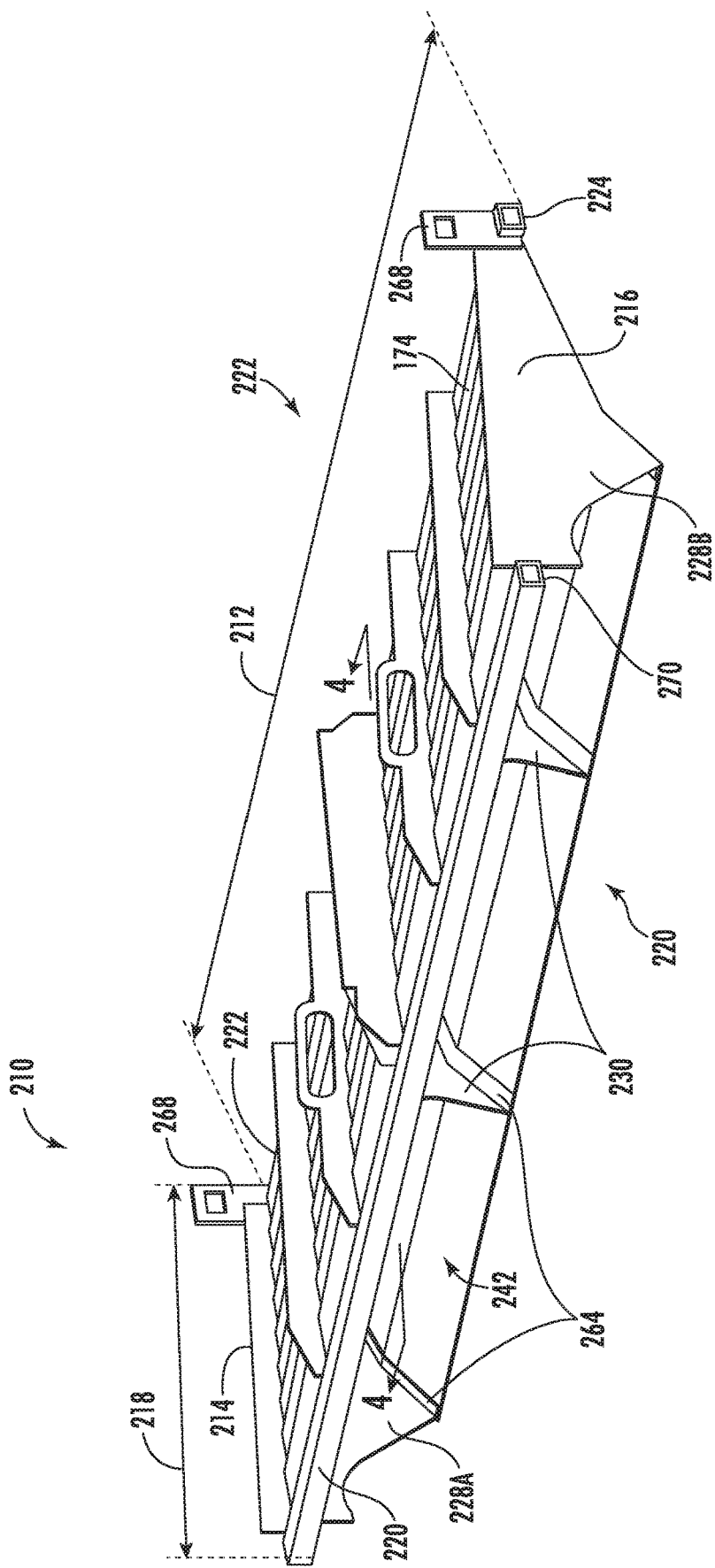
FIG. 3 illustrates a perspective view of one embodiment of a sieve assembly suitable for use within the agricultural harvester shown in FIG. 1 in accordance with aspects of the present subject matter, particularly illustrating the assembly including both a sieve for cleaning a flow of crop material and a clean crop material sheet for directing the cleaned crop towards an associated crop delivery apparatus of the harvester.
Figure 4:
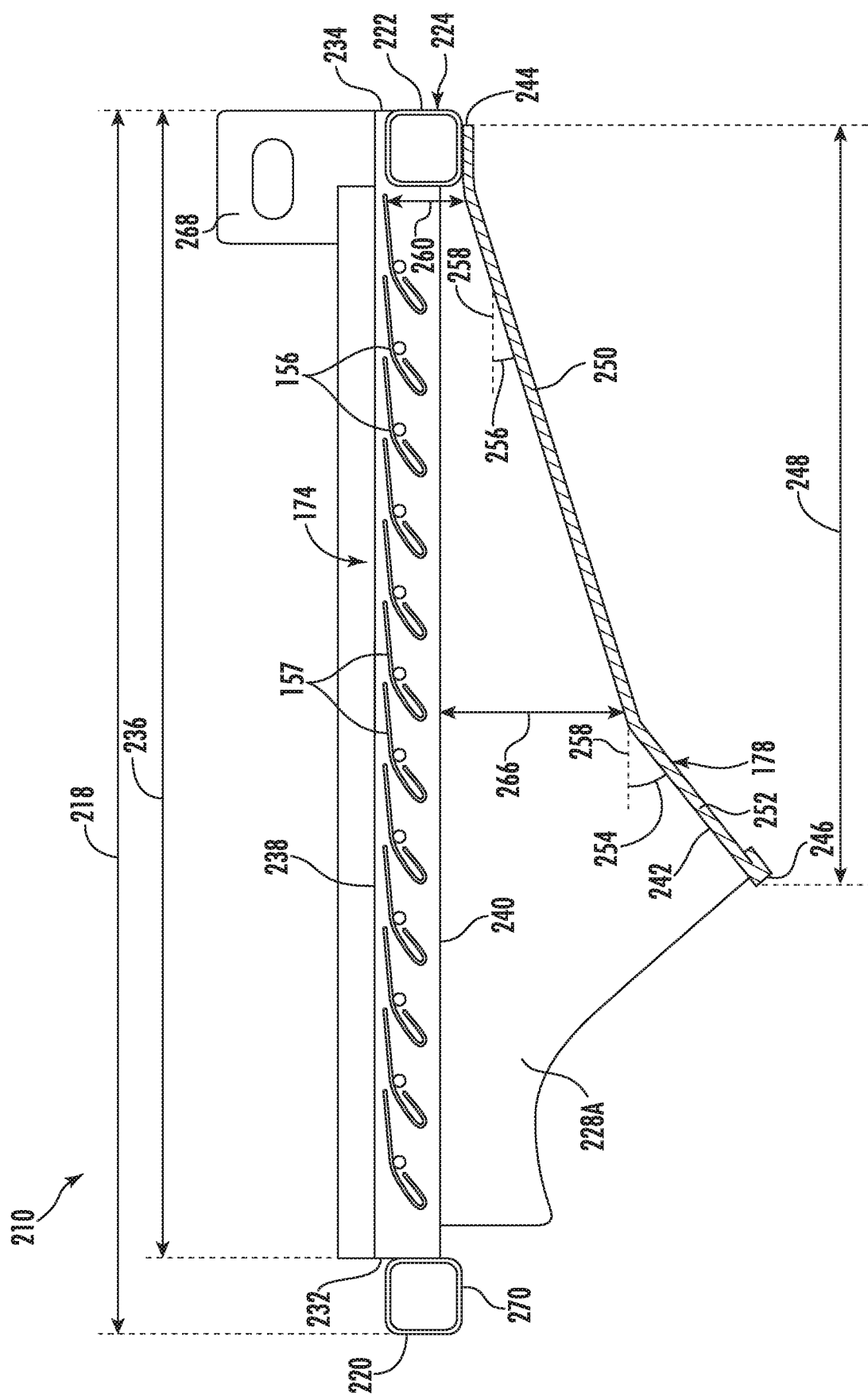
FIG. 4 illustrates a side, cross-sectional view of a portion of the embodiment of the sieve assembly shown in FIG. 3 taken about line 4-4 in accordance with aspects of the present subject matter, particularly illustrating aspects of the sieve, the clean crop material sheet and one or more support elements coupled between the sieve and the clean crop material sheet.

Referring now to FIGS. 3-5, various views of one embodiment of a sieve assembly 210 configured for use within a harvester 100 are illustrated in accordance with aspects of the present subject matter. Specifically, FIG. 3 illustrates a perspective view of the sieve assembly 210. FIG. 4 illustrates a side-sectional view of various components of the sieve assembly 210 shown in FIG. 3 taken about line 4-4. Additionally, FIG. 5 illustrates a perspective view of one of the support elements of the sieve assembly 210 shown in FIGS. 3 and 4.

As shown in FIG. 3, the sieve assembly 210 may generally extend in a lateral direction along a width 212 defined between a first lateral side 214 of the sieve assembly and a second lateral side 216 of the sieve assembly 210. Additionally, as shown in FIGS. 3 and 4, the sieve assembly 210 may generally define a length 218 in a lengthwise direction of the assembly 210 extending between a first assembly end 220 and a second assembly end 222. In accordance with aspects of the present subject matter, the sieve assembly 210 may generally include a sieve (e.g., sieve 174 of FIG. 2) for separating grain from MOG within the flow of harvested crop material directed through the harvester 100 and a clean crop material sheet (e.g., sheet 178 of FIG. 2) for receiving the cleaned grain from the sieve 174 and for directing the cleaned grain towards the crop delivery apparatus 162 of the crop cleaning assembly 150. Additionally, in several embodiments, the sieve assembly 210 may also include one or more support elements 224, 228, 230 configured to be coupled directly between the sieve 174 and the clean crop material sheet 178, thereby providing a rigid structural connection between the assembly components.

It should be appreciated that, for purposes of discussion, the disclosed sieve assembly 210 will generally be described herein as including the lower sieve 174 and the associated clean crop material sheet 178 of the crop cleaning assembly 150 described above with reference to FIG. 2. However, in other embodiments, the sieve assembly 210 may generally include any suitable sieve have any suitable sieve configuration and/or any suitable clean crop material sheet having any suitable sheet configuration.

As shown in FIG. 4, the sieve 174 of the sieve assembly 210 may generally include a first sieve end 232 and a second sieve end 234 and may define a length 236 in the lengthwise direction of the sieve assembly 210 between its first and second sieve ends 232, 234. Additionally, as shown in FIG. 3, the sieve 174 may be configured to extend in the lateral direction across all or substantially all of the lateral width 212 of the sieve assembly 210 defined between its first and second lateral sides 214, 216. In one embodiment, the first sieve end 232 may generally correspond to the upstream end of the sieve 174 and may be configured to be positioned generally proximate to the first assembly end 220 of the sieve assembly 210. Similarly, in one embodiment, the second sieve end 234 may generally correspond to the downstream end of the sieve 174 and may be configured to be positioned generally proximate to the second assembly end 222 of the sieve assembly 210. During operation of the sieve assembly 210, harvested crop material 106 may be configured to be deposited onto the sieve 174 (e.g., from the upper sieve 172). The harvested crop material 106 may then be translated along the length 236 of the sieve 174 from the first or upstream end 232 of the sieve 174 towards the second or downstream end 234 of the sieve 174 as the crop material 106 is being cleaned.

The sieve 174 may also include a plurality of openings 156 extending therethrough from an upper side 238 of the sieve 174 to a lower side 240 of the sieve 174. In addition, the sieve 174 may include a plurality of vanes 157 spaced apart from one another along the length 236 of the sieve 174 such that the openings 156 are defined between the vanes 157. As is generally understood, the vanes 157 may be disposed along the length 236 of the sieve 174 such that only the cleaned crop material 108 or particles of a smaller size may fall through the openings 156. In some embodiments, the position of the vanes 157 may be adjustable such that the size of the openings 156 may, in turn, be adjusted to accommodate harvested crop material 106 of different sizes and/or types. The vanes 157 may also help direct the flow of cleaned crop material 108 as such material 108 moves through the openings 156 towards the clean crop material sheet 178.

In general, the clean crop material sheet 178 of the sieve assembly 210 may be configured to be positioned vertically below the sieve 174 so as to receive the flow of cleaned crop material 208 directed through the openings 156 defined in the sieve 174 along an upper side 242 of the sheet 178. As particularly shown in FIG. 4, the clean crop material sheet 178 may generally extend lengthwise between a first sheet end 244 and a second sheet end 246 (e.g., along length 248 of the clean crop material sheet 178). In addition, as shown in FIG. 3, the clean crop material sheet 178 may be configured to extend in the lateral direction along all or substantially all of the lateral width 212 of the sieve assembly 210 (e.g., from the first lateral side 214 of the assembly 210 to the second lateral side 216 of the assembly 210). In several embodiments, the first sheet end 244 of the clean crop material sheet 178 may generally correspond to the upstream end of the sheet 178 and may be configured to be positioned generally proximal to both the second or downstream end 234 of the sieve 174 and the second assembly end 222 of the sieve assembly 210. Similarly, the second sheet end 246 may generally correspond to the downstream end of the clean crop material sheet 178 and may be configured to be positioned at or adjacent to an intake end of the crop delivery apparatus 162. In one embodiment, the vanes 157 of the sieve 174 may be oriented such that the flow of cleaned crop material 108 transmitted through the openings 156 is generally directed towards the downstream end 246 of the clean crop material sheet 178.

In some embodiments, the clean crop material sheet 178 may be angled downwardly from its first, upstream end 244 towards its second, downstream end 246 such that the flow of cleaned crop material 208 is directed downwardly towards the adjacent crop delivery apparatus 162. For example, as shown in FIGS. 3 and 4, the clean crop material sheet 178 may, in one embodiment, include a first angled section 250 and a second angled section 252. The first angled section 250 may generally extend lengthwise from a location proximate the first upstream end 244 of the sheet 178 to the intersection defined between the first and second angled sections 250, 252, while the second angled section 252 may generally extend lengthwise between the first angled section 250 and the second, downstream end 246 of the sheet 178. As shown in FIG. 4, the first angled section 250 may be oriented at a first angle 254 relative to a reference plane 258 and the second angled section 252 may be oriented at a second angle 256 relative to the reference plane 258. In one embodiment, the reference plane 258 generally corresponds to a horizontal reference plane such that the first and second angles 254, 256 extend downwardly from the reference plane 258. As shown in FIG. 4, the first and second angles 254, 256 may differ such that the first angle 254 is smaller than the second angle 256. In such an embodiment, the second angled section 252 may be sloped more steeply relative to the reference plane 258 than the first angled section 250. As such, a velocity of the flow of cleaned crop material 108 along the second angled section 250 may be greater than the velocity of the flow of the cleaned crop material 108 along the first angled section 250 of the clean crop material sheet 178. It should be appreciated that, in other embodiments, the clean crop material sheet 178 may include further angled sections, wherein each further section extends at a steeper angle relative to the reference plane 258 than the section upstream of and adjacent to such further section. Alternatively, in other embodiments, the second angle 256 may be smaller than the first angle 254 such that the first angled section 254 may be sloped more steeply relative to the reference plane 258 than the second angled section 256 and such that, when the clean crop material sheet 178 includes further angled sections, each further section may extend either at a steeper angle or shallower angle relative to the reference plane 258 than the section upstream of and adjacent to such further section. In yet another embodiment, the clean crop material sheet 178 may include one or more curved or actuate sections as opposed to (or in addition to) the angled sections described above.

As indicated above, the sieve assembly 210 may also include one or more support elements 224, 228, 230 directly coupled between the sieve 174 and the clean crop material sheet 178. In general, the support element(s) 224, 228, 230 may be configured to provide structural support for the sieve 174 and the clean crop material sheet 178 within the harvester 100 and may also be configured to structurally couple the components together to form a unitary assembly. For example, the support element(s) 224, 228, 230 may be configured to provide lateral and/or vertical stiffness or rigidity to the sieve 174 and/or the clean crop material sheet 178, thereby allowing such components to resist loads applied on the sieve assembly 204 to prevent, for example, undesired bending. In addition, by structurally connecting the sieve 174 and the clean crop material sheet 178 together via the support element(s) 224, 228, 230, the assembled components can be quickly and easily installed within and/or removed from the harvester 100 as an integral assembly 210. As will be described below, in several embodiments, the disclosed support element(s) may include one or more lateral support elements 224, one or more vertical support elements 228, 230, and/or any combination thereof.

For example, the sieve assembly 210 may include a lateral support element 224 extending in the lateral direction (e.g., transverse to the flow of crop material 106 across the sieve 174 and the flow of cleaned crop material across the crop material sheet 178) along all or a portion of the lateral width 212 of the sieve assembly 210 that is configured to be coupled directly between the sieve 174 and the clean crop material sheet 178. As particularly shown in FIG. 4, the lateral support element 224 may, in one embodiment, be configured to be fixedly coupled to the sieve 174 (e.g., via welding or mechanical fasteners) at or adjacent to its second or downstream end 234 and to the clean crop material sheet 178 (e.g., via welding or mechanical fasteners) at or adjacent to its first or upstream end 244. In such an embodiment, the lateral support element 224 may, for example, be coupled between the adjacent ends 234, 244 of the sieve 174 and the clean crop material sheet 178 such that the lower side 240 of the sieve 174 contacts the top side of the lateral support element 224 while the upper side 242 of the clean crop material sheet 178 contacts the bottom side of the lateral support element 224. As a result, the lateral support element 224 may provide lateral stiffness and/or rigidity to both the sieve 174 and the clean crop material sheet 178 across the lateral width 212 of the sieve assembly 210.

As shown in FIG. 4, in one embodiment, the second, downstream end 234 of the sieve 174 may be vertically spaced apart from the first, upstream end 244 of the clean crop material sheet 178 by a vertical distance or gap 260 that extends laterally (e.g., into the page in the view of FIG. 4) across the entire lateral width 212 of the sieve assembly 210. In such an embodiment, the lateral support element 224 may be coupled between the sieve 174 and the clean crop material sheet 178 so that the lateral support element 224 extends fully across the gap 260 (e.g., both vertically and laterally). As a result, the lateral support element 224 may enclose or otherwise fill-in the gap 260 defined between the sieve 174 and the clean crop material sheet 178, thereby preventing any cleaned crop material 108 from flowing through the gap 260.

It should be appreciated that the lateral support element 224 may generally have any suitable configuration and/or may be formed from any suitable material that allows it to provide structural support for the sieve 174 and the clean crop material sheet 178. For example, as shown in the illustrated embodiment, the lateral support element 224 is configured as a structural tube having a hollow, square-shaped cross-section and being formed from a substantially rigid material (e.g., steel). However, in other embodiments, the lateral support element 224 may have any other suitable configuration, including any other suitable cross-sectional shape, that allows it to function as described herein.

Additionally, as indicated above, the sieve assembly may also include one or more vertical support elements 228, 230 coupled to both the sieve 174 and the clean crop material sheet 178 (e.g., via welding or mechanical fasteners) and extending vertically therebetween so as to provide vertical structural support for the sieve assembly 210. In several embodiments, the vertical support element(s) 228, 230 may extend lengthwise between the sieve 174 and the clean crop material sheet 178 along all or a substantial portion of both the length 236 of the sieve 174 and the length 248 of the clean crop material sheet 178. In addition, in one embodiment, the vertical support element(s) 228, 230 may be oriented in the lengthwise direction generally parallel to the flow of the cleaned crop material 108 along the clean crop material sheet 178.

As particularly shown in FIG. 5, each vertical support element 228, 230 (or a portion thereof) may, in one embodiment, include an upper feature 262 and a lower feature 264 for coupling the vertical support element(s) 228, 230 to the sieve 174 and the clean crop material sheet 178, respectively. For example, in the illustrated embodiment, the upper and lower features 262, 264 correspond to flanges configured to allow the vertical support element(s) 228, 230 to be coupled to the sieve 174 and the clean crop material sheet 178 via welding or suitable mechanical fasteners. However, in other embodiments, the upper and lower features 262, 264 may correspond to any other suitable attachment features that allow the vertical support element(s) 228, 230 to be coupled between the sieve 174 and the clean crop material sheet 178, such as grooves, openings, mating features (e.g., male and/or female features), and/or the like.

In several embodiments, the vertical support element(s) of the sieve assembly 210 may include one or more vertically oriented side support elements 228, such as a first side support element 228A and a second side support element 228B. As particularly shown in FIG. 3, the first side support element 228A may be configured to extend substantially vertically between the sieve 174 and the clean crop material sheet 178 along the first lateral side 214 of the sieve assembly 210 while the second side support element 228B may be configured to extend substantially vertically between the sieve 174 and the clean crop material sheet 178 along the second lateral side 216 of the sieve assembly 210. In such an embodiment, the first and second side support elements 228A. 228B may generally define sidewalls for the sieve assembly 210 that at least partially enclose or define an interior space 266 extending vertically between the sieve 174 and the clean crop material sheet 178 and laterally between the first and second lateral sides 214, 216 of the sieve assembly 210. As such, in addition to providing vertical structural support for the sieve assembly 210, the first and second side support elements 228A, 228B may also define outer lateral flow boundaries for the flow of cleaned crop material 108 passing through the lateral interior space 266 as it flows towards the downstream end 246 of the clean crop material sheet 178.

Moreover, in addition to the side support elements 228A, 228B (or as an alternative thereto), the vertical support element(s) of the sieve assembly 210 may include one or more vertically oriented interior support elements 230. For example, as shown in FIG. 3, the sieve assembly 210 includes a pair of interior support element(s) 230 extending vertically between the sieve 174 and the clean crop material sheet 178 in the lengthwise direction along a substantial portion of the length 218 of the sieve assembly 210. In such an embodiment, the interior support elements 230 may be spaced apart laterally from each other and also from the lateral sides 214, 216 of the sieve assembly 210 (and/or the side support elements 228A, 228B) along the lateral width 212 of the assembly 210. As such, in addition to providing vertical structural support between the sieve 174 and the clean crop material sheet 178, the interior support element(s)

230 may also divide the lateral interior space 266 defined between the opposed lateral sides 214, 216 of the assembly 210 into separate flow channels, thereby dividing the flow of cleaned crop material 108 along the lateral width 212 of the sieve assembly 210 in order to further promote movement of the cleaned crop material 108 towards the downstream end 246 of the clean crop material sheet 178.

It should be appreciated that the disclosed sieve assembly 210 may also include one or more additional features for mounting and/or otherwise supporting the assembly 210 within the harvester 100. For example, as shown in FIGS. 3 and 4, in one embodiment, the sieve assembly 210 may include a pair of mounting brackets 268 positioned at the second end 222 of the assembly 210, such as by mounting the brackets 268 to the opposed lateral ends of the lateral support element 224 and/or the opposed lateral sides of the sieve 174 and/or the clean crop material sheet 178. In such an embodiment, the mounting brackets 268 may be used to facilitate mounting the sieve assembly 210 within the harvester 100. For example, the mounting brackets 268 may be configured to be coupled to suitable mounting features provided within the interior of the harvester 100 at the appropriate mounting location(s) for the assembly 210. Similarly, as shown in FIGS. 3 and 4, the sieve assembly 210 may also include a front mounting bar 270 extending along the lateral width 212 of the sieve assembly 210 at its front or first assembly end 220. In one embodiment, the front mounting bar 270 may be configured to engage corresponding internal mounting features of the harvester 100 to support the front end 220 of the assembly 210 within the harvester 100 upon installation of the assembly 210 therein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A sieve assembly for use in a crop processing system of an agricultural harvester, the sieve assembly comprising:
    a sieve extending along a length defined between a first sieve end and a second sieve end, the sieve configured to process a flow of crop material, the sieve defining a plurality of openings through which cleaned crop material of the flow of crop material is directed;
    a crop material sheet extending along a length defined between a first sheet end and a second sheet end, the crop material sheet configured to receive the cleaned crop material directed through the plurality of openings of the sieve, the crop material sheet transporting the cleaned crop material towards a separate component of the crop processing system; and
    at least one support element directly coupled between the sieve and the crop material sheet, the at least one support element comprising a coupling feature along a lowermost edge of the at least one support element, the crop material sheet connected to the lowermost edge of the at least one support element by the coupling feature, the at least one support element structurally connecting the sieve to the crop material sheet.

2. The sieve assembly of claim 1, wherein the at least one support element comprises a lateral support element directly coupled between the sieve and the crop material sheet, the lateral support element extending substantially transverse to the flow of crop material along the sieve.

3. The sieve assembly of claim 2, wherein the first sieve end corresponds to an upstream end of the sieve and the second sieve end corresponds to a downstream end of the sieve relative to the flow of crop material, and wherein the first sheet end corresponds to an upstream end of the clean crop material sheet and the second sheet end corresponds to a downstream end of the clean crop material sheet relative to a flow of the cleaned crop material, the second sieve end and the first sheet end being fixedly coupled to the lateral support element.

4. The sieve assembly of claim 3, wherein a gap is defined between the second sieve end of the sieve and the first sheet end of the crop material sheet, the lateral support element being positioned relative to the sieve and the crop material sheet such that the lateral support element extends across the gap along a lateral width of the sieve assembly.

5. The sieve assembly of claim 1, wherein the at least one support element comprises at least one vertical support element coupled directly between the sieve and the crop material sheet.

6. The sieve assembly of claim 5, wherein the at least one vertical support comprises a plurality of vertical support elements coupled between the sieve and the crop material sheet, the plurality of vertical support elements being spaced apart along a lateral width of the sieve assembly.

7. The sieve assembly of claim 6, wherein the lateral width is defined between a first lateral side of the sieve assembly and a second lateral side of the sieve assembly, the plurality vertical support elements comprising a first side support element extending vertically between the sieve and the crop material sheet along the first lateral side of the sieve assembly and a second side support element extending vertically between the sieve and the crop material sheet along the second lateral side of the sieve assembly.

8. The sieve assembly of claim 7, wherein the first and second side support elements are configured to at least partially enclose a lateral interior space defined between the first and second lateral sides of the sieve assembly.

9. The sieve assembly of claim 7, wherein the plurality vertical support elements further comprises at least one interior support element extending vertically between the sieve and the crop material sheet at a location between the first and second side support elements.

10. The sieve assembly of claim 1, wherein the crop material sheet includes a first angled section and a second angled section, the first angled section being oriented at a first angle relative to a reference plane and the second angled section being oriented at a second angle relative to the reference plane, the first angle differing from the second angle.

11. A crop processing system of an agricultural harvester, the crop processing system comprising:
    a crop delivery apparatus;
    a storage tank configured to receive a flow of cleaned crop material from the crop delivery apparatus; and
    a sieve assembly positioned upstream of the crop delivery apparatus relative to the flow of cleaned crop material, the sieve assembly comprising:
        a sieve extending between a first sieve end and a second sieve end, the sieve configured to process a flow of crop material, the sieve defining a plurality of openings through which the flow of cleaned crop material is directed, a crop material sheet extending between a first sheet end and a second sheet end, the crop material sheet configured to receive the flow of cleaned crop material directed through the plurality of openings of the sieve, the crop material sheet transporting the flow of cleaned crop material towards the crop delivery apparatus, and at least one support element directly coupled between the sieve and the clean crop material sheet, the at least one support element comprising a coupling feature along a lowermost edge of the at least one support element, the crop material sheet connected to the lowermost edge of the at least one support element by the coupling feature, the at least one support element structurally connecting the sieve to the crop material sheet;

wherein the crop delivery apparatus is configured to transport the flow of cleaned crop material received from the sieve assembly to the storage tank of the agricultural harvester.

12. The sieve assembly of claim 11, wherein the at least one support element comprises a lateral support element directly coupled between the sieve and the crop material sheet, the lateral support element extending substantially transverse to the flow of crop material.

13. The sieve assembly of claim 12, wherein the first sieve end corresponds to an upstream end of the sieve and the second sieve end corresponds to a downstream end of the sieve relative to the flow of crop material, and wherein the first sheet end corresponds to an upstream end of the clean crop material sheet and the second sheet end corresponds to a downstream end of the clean crop material sheet relative to the flow of cleaned crop material, the second sieve end and the first sheet end being fixedly coupled to the lateral support element.

14. The sieve assembly of claim 13, wherein a gap is defined between the second sieve end of the sieve and the first sheet end of the crop material sheet, the lateral support element being positioned relative to the sieve and the crop material sheet such that the lateral support element extends across the gap along a lateral width of the sieve assembly.

15. The sieve assembly of claim 11, wherein the at least one support element comprises at least one vertical support element coupled directly between the sieve and the crop material sheet.

16. The sieve assembly of claim 15, wherein the at least one vertical support comprises a plurality of vertical support elements coupled between the sieve and the crop material sheet, the plurality of vertical support elements being spaced apart along a lateral width of the sieve assembly.

17. The sieve assembly of claim 16, wherein the lateral width is defined between a first lateral side of the sieve assembly and a second lateral side of the sieve assembly, the plurality vertical support elements comprising a first side support element extending vertically between the sieve and the crop material sheet along the first lateral side of the sieve assembly and a second side support element extending vertically between the sieve and the crop material sheet along the second lateral side of the sieve assembly, the first and second side support elements being configured to at least partially enclose a lateral interior space defined between the first and second lateral sides of the sieve assembly.

18. The sieve assembly of claim 17, wherein the plurality vertical support elements further comprises at least one interior support element extending vertically between the sieve and the crop material sheet at a location between the first and second side support elements.

19. The sieve assembly of claim 17, wherein the crop material sheet includes a first angled section and a second angled section, the first angled section being oriented at a first angle relative to a reference plane and the second angled section being oriented at a second angle relative to the reference plane, the first angle differing from the second angle.

20. A sieve assembly for use in a crop processing system of an agricultural harvester, the sieve assembly comprising:

a sieve extending between a first sieve end and a second sieve end, the sieve configured to process a flow of crop material, the sieve defining a plurality of openings through which a flow of cleaned crop material is directed;

a crop material sheet extending between a first sheet end and a second sheet end, the crop material sheet configured to receive the flow of cleaned crop material directed through the plurality of openings of the sieve, the crop material sheet transporting the flow of cleaned crop material towards a separate component of the crop processing system; and at least one support element directly coupled between the sieve and the crop material sheet, the at least one support element comprising a coupling feature along a lowermost edge of the at least one support element, the crop material sheet connected to the lowermost edge of the at least one support element by the coupling feature, the at least one support element structurally connecting the sieve to the crop material sheet, wherein the sieve and the crop material sheet are coupled together such that the sieve assembly is installable within and removable from the agricultural harvester as a unitary assembly.

\* \* \* \* \*